US007241829B2

(12) United States Patent
Chung et al.

(10) Patent No.: US 7,241,829 B2
(45) Date of Patent: Jul. 10, 2007

(54) EXFOLIATED POLYOLEFIN/CLAY NANOCOMPOSITES USING CHAIN END FUNCTIONALIZED POLYOLEFIN AS THE POLYMERIC SURFACTANT

(75) Inventors: Tze-Chiang Chung, State College, PA (US); Evangelos Manias, State College, PA (US); Zhiming M. Wang, Evanston, IL (US)

(73) Assignee: The Penn State Research Foundation, University Park, PA (US)

( * ) Notice: Subject to any disclaimer, the term of this patent is extended or adjusted under 35 U.S.C. 154(b) by 368 days.

(21) Appl. No.: 10/891,358

(22) Filed: Jul. 14, 2004

(65) Prior Publication Data

US 2005/0014905 A1    Jan. 20, 2005

Related U.S. Application Data

(60) Provisional application No. 60/488,552, filed on Jul. 18, 2003.

(51) Int. Cl.
    C08K 3/34    (2006.01)
(52) U.S. Cl. ............... 524/445; 524/447; 524/448; 524/449; 524/460; 524/459
(58) Field of Classification Search ............... 524/445, 524/447, 448, 449, 460, 459
    See application file for complete search history.

(56) References Cited

U.S. PATENT DOCUMENTS

| 5,939,495 | A | 8/1999 | Kioka et al. ............... 525/356 |
| 5,973,053 | A * | 10/1999 | Usuki et al. ............... 524/445 |
| 6,248,837 | B1 | 6/2001 | Chung et al. ............... 525/245 |
| 6,479,600 | B2 | 11/2002 | Chung et al. ............... 526/160 |

OTHER PUBLICATIONS

Lan et al. Chem. Mater. vol. 6, 2216-2219 (1994).*
"Synthesis of nylon 6-clay hybrid," A. Usuki, Y. Kojima, M. Kawasumi, A. Okada, Y. Fukushima, Y. Kurauchi, O. Kamigaito J. Mater. Res., vol. 8, No. 5, pp. 1179-1184, May 1993.
"Synthesis of Nylon 6-Clay Hybrid by Montmorillonite Intercalated with E-Caprolactam," Y. Kojima, A. Usuki, M. Kawasumi, A. Okada, T. Kurauchi, O. Kamigaito, J. Polymer Sci: Part A: Polymer Chemistry, vol. 31, 983-986 (1993).
"Synthesis and Properties of Two-Dimensional Nanostructures by Direct Intercalation of Polymer Melts in layered Silicates, Richard Vala, Hope Ishii, Emmanuel Giannelis," Chem. Mater. 1993, 5, 1694-1696.
"Flammability Properties of Polyer-Layered-Silicate Nanocomposites Polypropylene and Polystyrene Nanocomposites," J. Gilman, C. Jackson, A. Morgan, and R. Harris, Jr., Evangelos Manias, Emmanuel Giannelis, M. Wuthenow, Dawn Hilton, Shawn Philips, Chem. Mater., 2000, 12, 1866-1873.
"New Biomedical Poly(urethane urea)-Layered Silicate Nanocomposites," Ruijian Xu, Evangelos Manias, Alan Snyder, James Runt, Macromolecules, 2001, 34, 337-339.

"Clay-Reinforced Epoxy Nanocomposites," Tie Lan and Thomas J. Pinnavaia, Chem. Mater., 1994, 6, 2216-2219.
"Morphology of polymer/silicate nanocomposites—high density polyethylene and a nitrile copolymer," H.G. Jeon, H.T. Jung, S.W. Lee, S.D. Hudson, Polymer Bulletin, 41, 107-113 (1998).
"Polymer Layered Silicate Nanocomposites," Emmanuel P. Ginnelis, Adv. Mater. 1996, 8, No. 1, pp. 29-35.
"Structure and Properties of Poly(vinyl alcohol)/Na+ montmorillonite Nanocomposites," K. E. Strawhecker, E. Manias, Chem Mater. 2000, 12, 2943-2949.
"New POlymer Electrolyte Nanocomposites: Melt Intercalation of Poly(ethylene oxide) in Mica-Type Silicates," Richard Vala, S. Vasudevan, W. Krawiec, L. Scanlon, E. Giannelis, Adv. Mater. 1995, 7, No. 2, pp. 154-156.
"Polymer-Silicate Nanocomposites: Model Systems for Confined Polymers and Polymer Brushes," E.P. Giannelis, R. Krishnamoorti, E. Manias, Advances in Polymer Science, vol. 138, pp. 107-147.
"Modeling the Interactions between Polymers and Clay Surfaces through Self-Consistent Field Theory," Anna Balazs, Chandralekha Singh, Ekaterina Zhulina, Macromolecules 1998, 31, 8370-8381.
"Phase behavior of end-functionalized polyers confined between two surfaces," D. Kuznetsov, A. Balazs, J Chem Phys, vol 113 (6), pp. 2479-2483, Aug. 8, 2000.
"Synthesis of Polypropylene Oligomer-Clay Intercalation Compounds," M. Kato, A Usuki, A. Okada, J of Applied Polymer Science, vol. 66, 1781-1785 (1997).
"Preparation and Mechanical Properties of Polypropylene-Clay Hybrids Using a Maleic Anhydride-Modified Polypropylene Oligomer," Journal of Applied Polymer Science, vol. 67, 87-92 (1998).
"Factors controlling mechanical properties of clay mineral/ polypropylene nanocomposites," A. Oya, Y. Kurokawa, H. Yasuda J Mater Sci, (35) 2000, pp. 1045-1050.
"Poly(propylene)/organoclay nanocomposite formation: Influence of compatibilizer functionality and organoclay modification," P. Reichert, H. Nitz, S. Klinke, R. Brandsch, R. Thomann, R. Mulhaupt, Macromol. Mater. Eng. 275, 8-177 (2000).
"Influence of Crytallization on Intercalation, Morphology, and Mechanical Properties of Polypropylene/Clay Nanocomposites," P. Maiti, P. Nam, M. Okamoto, Macromolecules 2002, 35, 2042-2049.
"Morphology and Mechanical Properties of Polypropylene/ Organoclay Nanocomposites," P. Svoboda, C. Zeng, H. Wang, LJ Lee, D. Tomasko, Journal of Applied Polymer Science, vol. 85, 1562-1570 (2002).
"Some Aspects of Polypropylene Functionalization by Free Radical Reactions," Eur. Polym. J. vol. 19, No. 10/11, pp. 863-866, 1983.
"13C NMR Study of the Grating of maleic Anhydride onto Polyethene, Polypropene, and Ethene—Propene Copolymers," W. Heinen, DH Rosenmoller, CB Wenzel, HJM deGroot, and J Lugtenburg, M van Duin, Macromolecules 1996, 29, 1151-1157.

(Continued)

Primary Examiner—Ling-Sui Choi
(74) Attorney, Agent, or Firm—Gifford, Krass, Sprinkle, Anderson & Citkowski, P.C.

(57) ABSTRACT

Polyolefin/clay nanocomposites with an exfoliated structure are prepared by a process which employs a specific chain end functionalized polyolefin that serves as the clay/polyolefin interfacial compatibilizer (or polymeric surfactant). The polyolefin contains a hydrophilic terminal functional group and an unperturbed hydrophobic high molecular weight polymer chain. The reaction may be carried out in a melt or solution process. Also disclosed are materials made by the process. Also disclosed are materials made by the process.

17 Claims, 3 Drawing Sheets

OTHER PUBLICATIONS

"Maleic Anhydride Modified Polypropylene with Controllable Molecular Structure: New Synthetic Route via Borane-Terminated Polypropylene," B. Lu and T.C. Chung, Macromolecules 1998, 31, 5943-5946.

"New Maleic Anhydridge Modified PP Copolymers with Block Structure: Synthesis and Application in PP/Polyamide Reactive Blends," B. Lu and T.C. Chung, Macromolecules 1999, 32, 2525-2533.

""Living" Coordination Polymerization of Propene Initiated by the Soluble V(acac)3-Al(C2H5)2Cl System," Y. Doi, Satoshi Ueki, and Tominaga Keii, Macromolecules, vol. 12, No. 5, Sep.-Oct. 1979, 814-819.

"Living Coordination Polymerization of Propene with Highly Active Vanadium-Based Catalyst," Yoshiharu Doi, Shigeo Suzuki, Kazuo Soga, Macromolecules 1986, 19, 2896-2900.

"New Approach to Block Copolymerizations of Ethylene with Alkyl Methacrylates and Lactones by Unique Catalysis with Organolanthanide Complexes," Hajime Yasuda, Masahito Furo, Hitoshi Yamamoto, Akira Nakamura, Shigenobu Miyake, Nobuyuki Kibino, Macromolecules 1992, vol. 25, No. 19, 5115-5116.

"Cobalt(III)-Catalyzed Living Polymerization of Ethylene: Routes to End-Capped Polyethylene with a Narrow Molar Mass Distribution," M. Brookhart, J.M. Desimone, B.E. Grant, M.J. Tanner, Macromolecules, 1995, vol. 28, No. 15, 5378-5380.

"A novel synthesis of PP-b-PMMA copolymers via metallocene catalysis and borane chemistry," T.C. Chung, H.L. Lu, W. Janvikul, Polymer, vol. 38, No. 6, 1997, 1495-1502.

Novel Polypropene Materials Derived from Vinylidene-terminated Oligopropenes, R. Mulhaupt, T. Duschek, D. Fischer, S. Setz, Polymers for Advanced Technologies, vol. 4, 439-449.

"Synthesis of Terminally Aluminum-Functionalized Polypropylene," Takeshi Shiono, Kazuo Soga, Macromolecules 1992, vol. 25, No. 13, 3356-3361.

"Novelty of Vinylidene-Terminated Polypropylene Prepared by a MgCl2-Supported TiCl4 Catalyst Combined with AlEt3 as Cocatalyst," Takeshi Shiono, Kap Ku Kang, Hideaki Hagihara, Tomiki Ikeda, Macromolecules 1997, vol. 30, 5997-6000.

"Synthesis of carboxy- and chloro-terminated poly(propylene)s using Zn(C2H5)2 as chain transfer reagent," Takeshi Shiono, Hiroki Kurosawa, Kazuo Soga, Makromol. Chem. 193, 2751-2761 (1992).

"Synthesis of a, w-dialykenyl isotactic poly(propylene) using bis(4-methyl-3-pentenyl)zinc as a chain transfer reagent," Hiroki Kurosawa, Takeshi Shiono, Kazuo Soga, Macromol. Chem. Phys. 195, 3303-3309 (1994).

"Synthesis of functional polyolefin copolymers with graft and block structures," T.C. Chung, Prog. Polym. Sci. 27 (2002) 39-85.

"Borane Chain Transfer Agent in Metallocene-Mediated Olefin Polymerization. Synthesis of Borane-Terminated Polyethylene and Diblock Copolymers Containing Polyethylene and Polar Polymer," Guangxue Xu, T.C. Chung, J. Am. Chem. Soc. 1999, 121, 6763-6764.

"Synthesis of Syndiotactic Polystyrene (s-PS) Containing a Terminal Polar Group and Diblock Copolymers Containing s-PS and Polar Polymers," Guangxue Xu and T.C. Chung, Macromolecules 1999, 32, 8689-8692.

"A Novel Consecutive Chain Transfer Reaction to p-Methylstyrene and Hydrogen during Metallocene-Mediated Olefin Polymerization," T.C. Chung, J.Y. Dong, J. Amer. Chem. Soc., vol. 123, No. 21, 2001, 4871-4876.

"Synthesis of Polyethylene Containing a Terminal p-Methylstyrene Group: Metallocene-Mediated Ethylene Polymerization with Consecutive Chain Transfer Reaction to p-Methylstyrene and Hydrogen," J.Y. Dong and T.C. Chung, Macromolecules, 2002, 35, 1622-1631.

"Synthesis of Isotactic Polypropylene Containing a Terminal Cl, OH, or NH2 Group via Metallocene-Mediated Polymerization/ Chain Transfer Reaction," J.Y. Dong, Z.M. Wang, H. Hong, and T.C. Chung, Macromolecules 2002, 35, 9352-9359.

* cited by examiner

EXFOLIATED POLYOLEFIN/CLAY NANOCOMPOSITES USING CHAIN END FUNCTIONALIZED POLYOLEFIN AS THE POLYMERIC SURFACTANT

RELATED APPLICATION

This application claims priority of U.S. Provisional Patent Application Ser. No. 60/488,552 filed Jul. 18, 2003, entitled "Exfoliated Polyolefin/Clay Nanocomposites Using Chain End Functionalized Polyolefin as the Polymeric Surfactant" which is incorporated herein by reference.

FIELD OF THE INVENTION

This invention relates to the preparation of exfoliated polyolefin/clay nanocomposites that show featureless X-ray diffraction (XRD) patterns. The process involves melt or solution blending using a specific polymeric surfactant which is a chain end functionalized polyolefin containing a terminal hydrophilic functional group and a high molecular weight hydrophobic polyolefin chain. This family of chain end functionalized polyolefins exhibits very high surface activities and results in the exfoliated clay interlayer structure, even with pristine clay material (which is understood to mean clay which has not been pretreated with organic surfactants or acids). Furthermore, this exfoliated clay structure maintains its disordered state even after further mixing with neat (unfunctionalized) polyolefin that is compatible with the backbone of the chain end functionalized polyolefin.

BACKGROUND OF THE INVENTION

Although it has long been known that polymers can be mixed with appropriately modified clay minerals and synthetic clays, the field of polymer/clay nanocomposites has recently attracted great interest. Two major findings pioneered the interest in these materials: First, the report of a nylon-6/montmorillonite (mmt) material from Toyota research (Kojima et al. *J. Mater. Res.* 1993, 8, 1179 and *J. Polym. Sci. Part A: Polym. Chem.* 1993, 31, 983), where it was shown that very moderate inorganic loadings resulted in concurrent and remarkable enhancements of thermal and mechanical properties. Second, Giannelis et al. found that it is possible to melt-mix polymers with clays without the use of organic solvents (*Chem. Mater.* 1993, 5, 1694). Since then, the high promise for industrial applications for these composites has motivated vigorous research. This research has revealed that concurrent dramatic enhancements of many properties of polymeric materials can be achieved by the nanodispersion of inorganic silicate layers. These improvements are generally applicable across a wide range of polymers in instances where the property enhancements originate from the nanocomposite structure. Property improvements that could not be realized by conventional fillers were also discovered in these nanoscale materials. Examples include increased tensile strength, flex modulus, impact toughness, general flame-retardant characteristics (Gilman et al. *Chem. Mater.* 2000, 12, 1866), and a dramatic improvement in barrier properties (Manias et al. *Macromolecules* 2001, 34, 337).

There are three general methods known in the prior art for the preparation of polymer/clay nanocomposites, including (i) in situ polymerization (Usuki et al. *J. Mater. Res.* 1993, 8, 1179 and Lan et al. *J. Chem. Mater.* 1994, 6, 2216), (ii) solution blending (Jeon et al. *Polymer Bulletin* 1998, 41, 107), and (iii) melt blending (Giannelis, E. *Adv. Mater.* 1996, 8, 29). All of the methods are aimed at achieving single layer dispersion of the layered silicate in the polymer matrix, because high surface area is directly associated with the enhanced properties in polymer/clay nanocomposites. For the in situ polymerization method, the initiator or catalyst is usually pre-fixed inside the clay interlayer via cationic exchange, then the layered silicate is swollen by monomer solution. The polymerization occurs in situ to form the polymer right between the interlayers with intercalated and/or exfoliated structures.

Solution blending involves the use of a polymer solution (or a prepolymer in the case of insoluble polymers such as polyimide). The layered silicates (modified with organic surfactants) can be easily dispersed in an appropriate solvent. The polymer should also be soluble in the same solvent. When the solvent is evaporated (or the mixture precipitated), the sheets try to reassemble, kinetically trapping the polymer between them to form a nanocomposite structure.

In the melt blending process, the layered silicate is mixed with the polymer matrix in the molten state. If the layer surfaces are sufficiently compatible with the chosen polymer, the polymer enters into the interlayer space and forms either an intercalated or an exfoliated nanocomposite. No solvent is required in this technique. It is obviously the most desirable industrial method.

In general, the pristine state clay (i.e. unmodified clay) having highly hydrophilic polar surfaces is only miscible with hydrophilic polymers such as poly(ethylene oxide) and poly(vinyl alcohol). (Manias et al. *Chem. Mater.* 2000, 12, 2943; Vaia et al. *Adv. Mater.* 1995, 7, 154). To render clay miscible with hydrophobic (non-polar) polymers, one must modify it by exchanging the alkali counterions with cationic-organic surfactants, such as alkylammoniums, to form organophilic clay (Giannelis et al. *Adv. Polym. Sci.* 1998, 138, 107). The organic surfactant not only changes the clay from hydrophilic to hydrophobic surfaces by cation-exchange of the cations ($Li^+$, $Na^+$, $Ca^{2+}$, etc.) between clay interlayers with onium ions in organic surfactants, it also expands the clay tight interlayer structure by increasing (001) d-spacing between the layers. Based on theoretical modeling (without any experimental results), Balazs et al. suggested the potential benefit of increasing the length of the surfactant (such as an end-functionalized chain with two terminal groups) to possibly promote the dispersion of bare clay sheets within the polymer matrix (Balazs et al. *Macromolecules* 1998, 31, 8370 and *J. Chem. Phys.* 2000, 113, 2479).

Experimentally, it is very common in polymer/clay nanocomposites to have a mixed nano-morphology, with both intercalated and exfoliated structures existing in the system. Intercalated structures are self-assembled, well-ordered multilayered structures where the extended polymer chains are inserted into the gallery space between parallel individual silicate layers separated by 2-3 nm. Conversely, the exfoliated structure results when the individual silicate layers are no longer close enough to interact with each other. In the exfoliated cases, the interlayer distances can be on the order of the radius of gyration of the polymer; therefore, the silicate layers may be considered to be well-dispersed in the organic polymer. The silicate layers in an exfoliated structure are typically not as well-ordered as those in an intercalated structure, although in many cases the exfoliated structures still bear signatures of the silicates' previous parallel registry.

Recent advances in polymer/clay and polymer/silicate nanocomposite materials have also inspired researchers to investigate polyolefin nanocomposites. Polyolefins, including polyethylene (PE), polypropylene (PP), syndiotactic polystyrene (s-PS), ethylene/propylene copolymer (EP), etc., largely prepared by Ziegler-Natta and metallocene catalysts, are a most important family of commercial polymers and have a unique combination of properties. These properties include low cost, good processability, recyclability, and a broad range of mechanical properties. Despite many commercial applications, polyolefins suffer a major deficiency, namely, poor interaction with other materials due to the lack of a polar functional group, which significantly limits their end uses, particularly those in which adhesion and compatibility with other materials is paramount (Chung "*Functionalization of Polyolefins*", Academic Press, London, 2002).

As expected, dispersing the highly hydrophilic silicate clay in hydrophobic polyolefins has been a great scientific challenge to date. Many prior art processes have focused on dispersing montmorillonite-based clay in PP, a thermoplastic with an attractive combination of properties and low cost (Kato et al. *J. Appl. Polym. Sci.* 1997, 66, 1781; Hasegawa et al. *J. Appl. Polym. Sci.* 1998, 67, 87; Oya et al. *J. Mater. Sci.* 2000, 35, 1045; Reichert et al. *Macromol. Mater. Eng.* 2000, 275, 8; Maiti et al. *Macromolecules* 2000, 35, 2042; Svoboda et al. *J. Appl. Polym. Sci.* 2002, 85, 1562). The general approach of improving the incompatible polyolefin blending problem has involved the use of both functional polyolefin containing polar groups and organophilic clay (pretreated with organic surfactant). Unfortunately, the availability of functional polyolefin is very limited due to the chemical difficulties in the functionalization of polyolefins. Most of the studies were based on the commercially available maleic anhydride grafted PP (PP-g-MAH) polymers that have very complicated molecular structure due to the many impurities and the many side reactions, including severe chain degradation, that occur during the free radical grafting process. (Ruggeri et al. *Eur. Polymer J.* 1983, 19, 863; Hinen et al. *Macromolecules*, 1996, 29, 1151; Chung et al. *Macromolecles* 1998, 31, 5943 and 1999, 32, 2525). Typically, the formed polyolefin/clay nanocomposites have a mixed nanomorphology, with both intercalated and exfoliated structures existing in the system. A similar strategy was also applied to prepare clay/rubber nanocomposites using the combination of organophilic clay and main chain and side chain functionalized polydiene rubbers (Usuki et al. U.S. Pat. No. 5,973,053).

Overall, there were no experimental results in the prior art demonstrating the advantage of using chain end functionalized polyolefin that can be directly mixed with neat silicate clay (without pretreatment with organic surfactants) to form exfoliated polyolefin/clay nanocomposites, or to maintain this disordered clay structure even after further mixing with neat polyolefin that is compatible with the backbone of the chain end functionalized polyolefin.

In general, the chemistry for preparing a functional group terminated polymer is very limited. Usually, this type of polymer structure is prepared by a combination of living polymerization and selective termination of the living polymers with suitable reagents. This is very rare in transition metal coordination polymerization. Only a few examples of living Ziegler-Natta and metallocene mediated olefin polymerization have been reported, and these have been accomplished under very inconvenient reaction conditions using specific catalysts. (Doi et al, *Macromolecules* 1979, 12, 814 and 1986, 19, 2896; Yasuda et al. *Macromolecules* 1992, 25, 5115; and Brookhart et al. *Macromolecules* 1995, 28, 5378). Due to the nature of living polymerization, each initiator only produces one polymer chain, therefore the overall polymer yield is extremely low compared with that of regular Ziegler-Natta and metallocene polymerization.

Another method reported for the preparation of functional group terminated polyolefin is based on chemical modification of chain end unsaturated polypropylene (PP), which can be prepared by metallocene polymerization or thermal degradation of high molecular weight PP. (See Chung et al. *Polymer* 1997, 38, 1495; Mulhaupt et al. *Polymers for Advanced Technologies* 1993, 4, 439; and Shiono et al. *Macromolecules* 1992, 25, 3356 and 1997, 30, 5997). The effectiveness of this chain end functionalization process is strongly dependent on (a) the percentage of polymer chains having a vinylidene terminal group and (b) the efficiency of the functionalization reaction. It has been observed that the efficiency of the functionalization reaction decreases with an increase in PP molecular weight, due to the decrease of vinylidene concentration. Some functionalization reactions are very effective for low molecular weight PP. However, they become very ineffective for PP polymer having a molecular weight in excess of about 10,000 g/mole. Unfortunately, for many applications (e.g., one that involves improving the interfacial interactions in PP blends and composites) a high molecular weight PP chain is essential. In addition, the availability of chain-end unsaturated polyolefins is very limited and most polyolefins, except polypropylene, have a low percentage of chain end unsaturation in their polymer chains.

Another approach for preparing functional group terminated polyolefin is via in situ chain transfer reaction to a co-initiator during Ziegler-Natta polymerization. Several Al-alkyl co-initiators (Kioka et al. U.S. Pat. No. 5,939,495) and Zn-alkyl co-initiators (Shiono et al. *Makromol. Chem.* 1992, 193, 2751 and *Makromol. Chem. Phys.* 1994, 195, 3303) were found to engage chain transfer reactions to obtain Al and Zn-terminated polyolefins, respectively. The Al and Zn-terminated polyolefins can be further modified to prepare polyolefins having other terminal functional groups. However, the products comprise a complex mixture of polymers containing various end groups, due to ill-defined catalyst systems that also involve other chain transfer reactions such as β-hydride elimination and chain transfer to monomer.

In recent years, Chung has discovered a facile and general method to prepare well-defined chain end functionalized polyolefins (PE, PP, s-PS, EP, etc.) containing a terminal functional group (OH, $NH_2$, COOH, anhydride, etc.), well-controlled polymer molecular weight, and narrow molecular weight and composition distributions (Chung *Prog. Polym. Sci.* 2002, 27, 39). The chemistry is centered at an in situ chain transfer reaction during metallocene-mediated α-olefin polymerization using two reactive chain transfer (CT) agents, including dialkylborane ($R_2B$—H) (Chung, U.S. Pat. No. 6,248,837; *J. Am. Chem. Soc.* 1999, 121, 6764; *Macromolecules* 2000, 32, 8689) and styrenic molecule/$H_2$ (Chung, U.S. Pat. No. 6,479,600; *J. Am. Chem. Soc.* 2001, 123, 4871; *Macromolecules* 2002, 35, 1622; *Macromolecules* 2002, 35, 9352), to form polyolefin containing a reactive alkylborane and styrenic terminal group, respectively. With an appropriate metallocene catalyst, the polymerization shows high catalyst activity, and the polymer formed shows narrow molecular weight distribution ($M_w/M_n$~2). The polymer molecular weight is inversely proportional to the molar ratio of [CT agent]/[α-olefin]. Furthermore, both reactive terminal groups can be quantitatively transformed to various desirable functional (polar) groups under mild reaction conditions, or even during the sample work-up step right after polymerization. The availability of a broad range of well-defined chain end functionalized polyolefins provides an advantage in evaluating their applications in polyolefin/clay nanocomposites.

SUMMARY OF THE INVENTION

The present invention discloses a new family of polyolefin/clay nanocomposites with exfoliated structures that show featureless X-ray diffraction (XRD) patterns. These materials are prepared utilizing a specific chain end functionalized polyolefin that serves as the clay/polyolefin interfacial compatibilizer (or polymeric surfactant), and may be represented by the following structural Formula (A):

—(M)$_n$—X—F  (A)

Wherein, M is the olefinic monomer having from 2 to 15 carbon atoms. In one group of embodiments, the preferred monomer units are derived from ethylene, propylene, 1-butene, isobutylene, 1-pentene, 1-hexene, 1-octene, 3-methyl-1-butene, 4-methyl-1-pentene, cyclopentene, norbornene, phenylnorbornene, indanylnorbornene, styrene, p-methylstyrene, butadiene, isoprene, 1,4-hexadiene, 1,5-hexadiene, divinylbenzene, and vinylidenenorborene. These monomers can be used either singly or as a combination of two or more types. The number n (representing the repeating monomer units) is between 100 and 100,000, a specific range is between 200 and 50,000, and a more specific range is between 300 and 10,000. The resulting polyolefin stereostructure can be any of the five types of tacticity known in polyolefins, including atactic, syndiotactic, isotactic, hemiisotactic and isotactic stereoblock, which are very much controlled by the catalyst used. F is a terminal hydrophilic functional group, such as OH, NH$_2$, COOH, anhydride, ammonium, immidazolium, sulfonium, or phosphonium cations, etc. X is the residue of the chain transfer agent or termination agent, and is an alkoxyl group, or linear, branched, cyclic or aromatic alkyl group having from 0 to 15 carbon atoms. In some instances, the chain transfer agent or termination agent will not leave a residue; therefore, X is an optional component.

The present invention is based on the use of functional polyolefins with a broad range of molecular structures and compositions which have been prepared in the inventors' laboratory and the realization that the chain end functionalized polyolefin (especially semi-crystalline PE and PP polymers) can adopt a unique molecular structure on the clay interfaces, which can result in a favorable exfoliated clay structure, and that this stable disorder state can be maintained even after further mixing with neat (unfunctionalized) polyolefin that is compatible with the backbone of the chain end functionalized polyolefin.

As illustrated in FIG. 1A, the terminal hydrophilic functional groups 10A and 10B in the chain end functionalized polyolefin binds to and anchors the polyolefin chains 12A and 12B to the surfaces between the clay interlayers 14A, 14B, either by strong interaction (such as hydrogen bonding) to the clay interlayer surfaces or ion-exchange with cations (Li$^+$, Na$^+$, Ca$^{2+}$, H$^+$, etc.) located between the clay interlayers. Conversely, the hydrophobic high molecular weight polyolefin chain 12A, 12B (which may have regions of crystallinity), disliking the hydrophilic clay surfaces, exfoliate the clay layer structure and maintains this disordered clay structure even after further mixing with neat polyolefin that is compatible with the backbone of the chain end functionalized polyolefin.

For comparison, FIG. 1B illustrates a completely different picture, showing a prior art structure made using side chain functionalized polyolefin 16 containing multiple functional groups 18 that are homogeneously distributed along the polymer chain (most of the known functional polyolefin structures). The functional groups can form multiple contacts with multiple clay surfaces 14A, 14B which not only result in polymer chain parallel to the clay surface but also bridge the clay interlayer structure. Therefore, utilizing prior art materials, formation of an ordered, intercalated composite structure is favored.

In another embodiment, the instant invention discloses a melt or solution process to prepare the exfoliated polyolefin/clay nanocomposites that exhibit featureless X-ray diffraction (XRD) patterns. The process comprises the step of blending with (a) from 1 to 98 parts by weight of the chain end functionalized polyolefin illustrated in Formula (A), (b) from 0 to 98 parts by weight of a corresponding neat polyolefin that is compatible with the backbone of the chain end functionalized polyolefin, and (c) from 1 to 20 parts by weight of clay material (with or without organic surfactant, and acidic clays). The process includes binary blending between chain end functionalized polyolefin and silicate clay, as well as multi-component blending by further melt or solution mixing of the above exfoliated binary or ternary polyolefin/clay nanocomposite with ancillary additives such as pigment, dyes, fillers, plasticizers, flame retardants, stabilizer, glass fibers or other reinforcing materials, carbon black, etc. The process also includes the mixed solution and melt blending steps. For example, the solution blending is first employed between chain end functionalized polyolefin and silicate clay, followed by melt blending of the formed binary blend with the corresponding neat polyolefin.

The example shown in FIG. 2 compares XRD patterns before and after melt binary blending (90/10 weight ratio) of an ammonium cation terminated i-PP (PP-t-NH$_3^+$Cl$^-$; M$_n$=58,900 and M$_w$=135,500 g/mol; T$_m$=158.2° C.) and a pristine montmorillonite clay having Na$^+$ cations (Na$^+$-mmt). The (001) peak at 2θ=7 for Na$^+$-mmt interlayer structure completely disappears after melt blending, indicating the formation of a disordered, exfoliated PP-t-NH$_3^+$Cl$^-$/Na$^+$-mmt nanocomposite. This binary PP-t-NH$_3^+$Cl$^-$/Na$^+$-mmt nanocomposite was further melt mixed (50/50 weight ratio) with commercial neat i-PP (Mn=110,000 and Mw=250,000 g/mol). FIG. 3 shows the XRD patterns of (a) simple mixing and (b) melt blending of the exfoliated PP-t-NH$_3^+$Cl$^-$/Na-mmt nanocomposite with neat i-PP. The stable exfoliated structure is clearly maintained after further mixing with neat polyolefin (unfunctionalized) that is compatible with the backbone of the chain end functionalized polyolefin.

DETAILED DESCRIPTION OF THE INVENTION

Figure 1A:
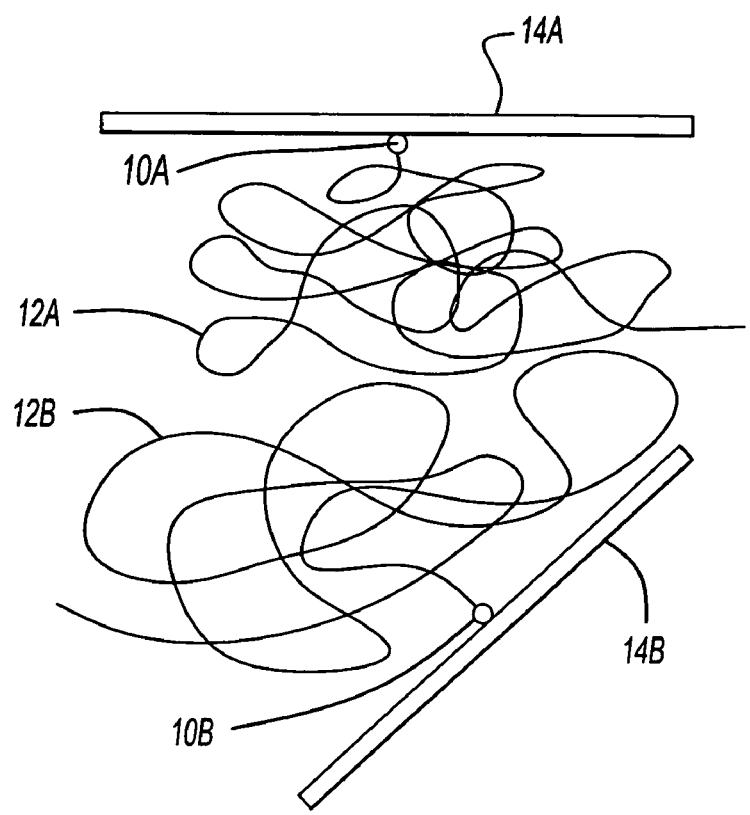
FIG. 1A is an illustration of the molecular structures of a nanocomposite material of the present invention having a disordered, exfoliated structure.

In accordance with the present invention, a specific group of chain end functionalized polyolefins are used as the clay/polyolefin interfacial compatibilizer (or polymeric surfactant) for the preparation of polyolefin/clay nanocomposites with a disordered, exfoliated structure. The chain end functionalized polyolefin is represented by the following structural Formula (A):

$$—(M)_n—X—F \qquad (A)$$

Wherein, M is the olefinic monomer typically having from 2 to 15 carbon atoms. One specific group of monomer units are derived from materials which include ethylene, propylene, 1-butene, isobutylene, 1-pentene, 1-hexene, 1-octene, 3-methyl-1-butene, 4-methyl-1-pentene, cyclopentene, norbornene, phenylnorbornene, indanylnorbornene, styrene, p-methylstyrene, butadiene, isoprene, 1,4-hexadiene, 1,5-hexadiene, divinylbenzene, and vinylidenenorborene. These monomers can be used either singly or as a combination of two or more types. The number n (representing the repeating monomer units) is between 100 and 100,000, a specific range is between 200 and 50,000, a more specific range is between 300 and 10,000. The resulting polyolefin stereo-structure can be any one of the five types of tacticity known in polyolefins, including atactic, syndiotactic, isotactic, hemiisotactic and isotactic stereoblock. The stereo-structure can be controlled by the catalyst used for the polymerization, as is known in the art. F is a terminal hydrophilic functional group, such as OH, $NH_2$, COOH, anhydride, ammonium cation, immidazolium cation, sulfonium cation, phosphonium cation, etc. X is the residue of the chain transfer agent or termination agent, and is an alkoxyl group or a linear, branched, cyclic or aromatic alkyl group having from 0 to 15 carbon atoms. In some instances, the transfer or termination agent may leave no residue; therefore, X may be optional.

The preferred method of preparing chain end functionalized polyolefin (A) is the in situ chain transfer reaction during the metallocene-mediated olefin polymerization using two reactive chain transfer (CT) agents, including dialkylborane ($R_2B$—H) and styrenic molecule/$H_2$, respectively are shown by Chung et al. in U.S. Pat. Nos. 6,248,837 and 6,479,600, the disclosures of which are incorporated herein by reference. Equation 1 illustrates the general polymerization mechanism during the metallocene-mediated olefin polymerization using dialkylborane ($R_2B$—H) chain transfer agent.

EQUATION 1

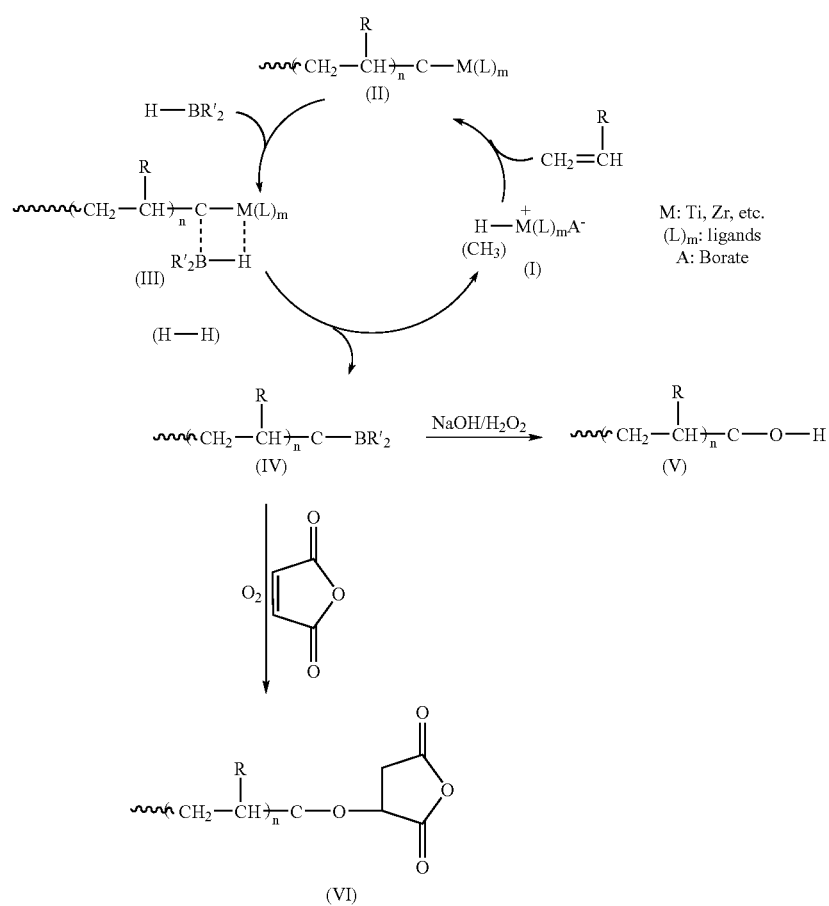

Wherein, R and R' are hydrogen or alkyl (linear, branched, cyclic or aromatic) having from 0 to 15 carbon atoms. The monomers can be used either singly or as a combination of two or more types. The number n (representing the repeating monomer units) is between 100 and 100,000, a preferred range between 200 and 50,000, and a most preferred range between 300 and 10,000. The resulting polyolefin stereostructure can be any one of the five types of tacticity known in polyolefins, including atactic, syndiotactic, isotactic, hemiisotactic and isotactic stereoblock, which are very much controlled by the catalyst used.

In the presence of a dialkylborane containing a B—H group, the metallocene-mediated propagating polyolefin chain (II) engages in a facile ligand exchange reaction between B—H and C—M (M: transition metal) bonds (III), due to the favorable acid-base interaction between the cationic (M) metal center and anionic (H) hydride. This ligand exchange reaction results in a borane-terminated polyolefin (IV) and a new active site (I) that can reinitiate the polymerization. Ideally, the chain transfer reaction should not change the overall catalyst activity, and each polymer will contain a terminal borane group with the polymer molecular weight inversely proportional to the molar ratio of [CT agent]/[α-olefin]. The terminal borane group is facile in transformation to various functional groups under mild reaction conditions (known in borane chemistry). As shown in Equation 1, the borane-terminated polyolefin (IV) is oxidized by $NaOH/H_2O_2$ to form the corresponding hydroxyl-terminated polyolefin (V), or oxidized by oxygen in the presence of anhydride to form anhydride-terminated polyolefin (VI).

The $H-BR'_2$ chain transfer agent usually forms a dimer structure in pure hydrocarbon solvents, which is inactive to carry out hydroboration reaction with olefin monomers (potential side reaction) under polymerization temperature. The preferred chain transfer agents are 9-borabicylcononane (9-BBN) and dimesitylborane $HB(Mes)_2$. Basically, the polymerization reaction can be carried out under the conditions similar to those in conventional Ziegler-Natta and metallocene polymerizations. In solution and dispersion polymerization processes where a hydrocarbon diluent is used, including hexane, heptane, cyclohexane, toluene, xylene, or the monomer itself, it is commonly practiced at a polymerization temperature ranging from 0 to 120° C., preferably from 25 to 90° C.

The other preferred chain transfer reaction during the metallocene-mediated olefin polymerization involves a mixed chain transfer agent, including styrenic molecule and $H_2$. The reaction mechanism may be further exemplified by the polymerization of propylene using rac-$Me_2Si[2-Me-4-Ph(Ind)]_2ZrCl_2$/MAO catalyst system in the presence of bis(trimethylsilane) protected p-ethylaminostyrene (St-$NSi_2$) and hydrogen. As illustrated in Equation 2, an aminostyrene-terminated polypropylene is formed in a one-pot reaction process. During the course of propylene 1,2-insertion, the propagating $M^+$-C site (II') reacts with a St-$NSi_2$ unit ($k_{12}$) (via 2,1-insertion) to form a St-$NSi_2$ capped propagating site (III') with an adjacent phenyl group interacting with metal cation. The new propagating site (III') is incapable of continuing the insertion of St-$NSi_2$ ($k_{22}$) or propylene ($k_{21}$) due to the steric jamming. However, it can react with hydrogen to complete the chain transfer reaction. This consecutive reaction with St-$NSi_2$ and hydrogen results in a PP-t-St-$NSi_2$ polymer chain (IV') and a regenerated Zr—H species (I') reinitiates the polymerization of propylene and continues the polymerization cycles. After completing the polymerization, the desirable $NH_2$ terminal group in PP-t-$NH_2$ (V') can be easily recovered during the sample work-up step using HCl aqueous solution. The PP-t-$NH_2$ molecular weight is linearly proportional to the molar ratio of [propylene]/[St-$NSi_2$].

EQUATION 2

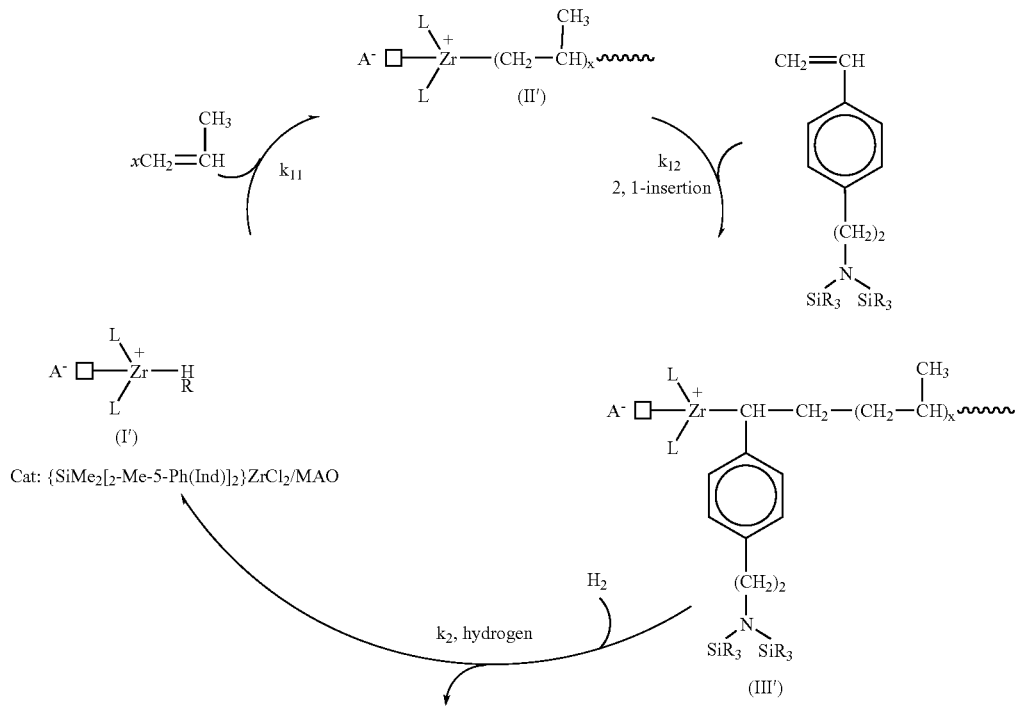

-continued

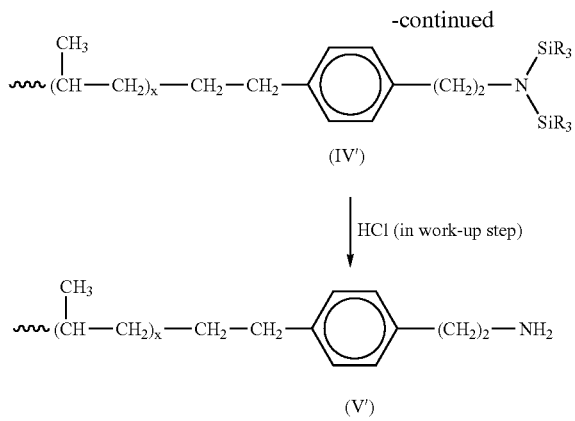

(IV')

↓ HCl (in work-up step)

(V')

It is essential to choose a metallocene catalyst having a specific bridged cyclopentadienyl or substituted cyclopentadienyl structure, which can only react with one styrene (or styrene derivative) molecule, without further chain extension by incorporating either olefin or styrenic monomers. Therefore, the styrenic unit-terminated propagating polyolefin chain has the chance to react with hydrogen to complete the chain transfer reaction. To produce high yield of the styrenic unit terminated polyolefin, it is also important to choose the metallocene catalyst that shows very low undesirable chain transfer reactions to hydrogen, monomer, co-catalyst, and β-hydride elimination, during the olefin homopolymerizations.

The styrenic chain transfer agents contemplated for use in the present invention include styrene and styrene derivatives containing a substituent that is stable to the active site under the polymerization conditions. The styrenic chain transfer agents may be illustrated by the following structural formula:

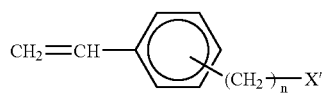

Wherein n is from 0 to about 6, and most preferably from 0 to about 3, and X' is a group selected from H, Cl, Br, I, COOR, O—BR"$_2$, O—SiR"$_3$, N(SiR"$_3$)$_2$, BR"$_2$, SiR"$_3$ (where R" is a $C_1$ to $C_{10}$ linear, branched or cyclic aliphatic alkyl group or aromatic alkyl group).

One major advantage of the polyolefins having a terminal functional group is that they exhibit very high surface activity on the silicate clay surfaces to exfoliate causing them to bind to a clay interlayer structure, even using the pristine clay material (without treatment with organic surfactants or acids). It is to be understood that such binding may involve van der Waals binding, hydrogen bonding, or the like, as well as chemical bonding.

Figure 1B:
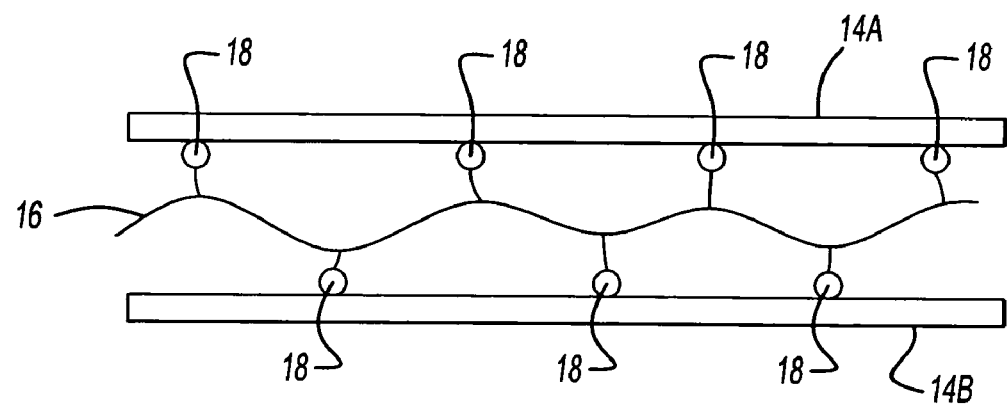
FIG. 1B is an illustration of the molecular structure of a polymer/clay composite of the prior art having an ordered, intercalated structure.

FIG. 1A illustrates the interaction pattern between chain end polyolefin 10 and the clay interlayer 14 surfaces. The terminal hydrophilic functional group 10A anchors the polyolefin 12A chain to the surfaces between the clay interlayers 14A, either by strong interaction (such as hydrogen bonding) to the clay interlayer surfaces or ion-exchange with cations (Li$^+$, Na$^+$, Ca$^{2+}$, H$^+$, etc.) located between the clay interlayers 14A. Conversely, the hydrophobic long polyolefin chain 12A, disliking the hydrophilic clay surfaces 14A, exfoliates the clay layer structure and maintains this disordered clay structure. Furthermore, this exfoliated clay structure maintains the disordered state after further mixing with neat (unfunctionalized) polyolefin that is compatible with the backbone of the chain end functionalized polyolefin. FIG. 1B shows a completely different picture using side chain functionalized polyolefin of the prior art that contains several functional (polar) groups 18 homogeneously distributed along the polymer chain 16. The multiple functional groups 18 are capable of forming multiple contact points between a polyolefin chain and both sides of clay surfaces 14A, which not only result in the polymer chain being disposed parallel to the clay surface but also highly bridging the clay interlayer structure. This results in the formation of an ordered, intercalated structure.

In another embodiment, the present invention discloses a melt or solution process to prepare the exfoliated polyolefin/clay nanocomposites, comprising (a) the chain end functionalized polyolefin from 1 to 98 parts by weight, (b) the corresponding neat polyolefin (unfunctionalized) from 0 to 98 parts by weight, and (c) silicate clay material (with or without organic surfactants, and acidic clays) from 1 to 20 parts by weight. The chain end functionalized polyolefin is represented by the following structural Formula (A) as described above:

—(M)$_n$—X—F           (A)

It should be understood that the process of the present invention may include binary and ternary blends in melt or solution. It may also include the pre-mixing of two components before adding the third one. For example, when the chain end functionalized polyolefin is pre-mixed with silicate clay (with or without treatment of organic surfactants or acid reagents) to form an exfoliated material that is then blended with the neat polyolefin that is compatible with the backbone of the chain end functionalized polyolefin. Alternatively, the process may also include the mixed solution and melt blending steps. For example, solution blending is firstly employed between chain end functionalized polyolefin and silicate clay, followed by melt blending of the formed binary blend with the corresponding neat polyolefin. Both the exfoliated binary or ternary polyolefin/clay nanocomposite blends can be further mixed with additives such as pigment, stabilizer, glass fibers, etc.

The neat polyolefin is the regular (unfunctionalized) polymer such as those prepared by Ziegler-Natta or metallocene coordination polymerization of alpha-olefins, such as ethylene, propylene, 1-butene, isobutylene, 1-pentene, 1-hexene, 1-octene, 3-methyl-1-butene, 4-methyl-1-pentene, cyclopentene, norbornene, phenylnorbornene, indanylnorbornene, styrene, p-methylstyrene, butadiene, isoprene, 1,4-hexadiene, 1,5-hexadiene, divinylbenzene, vinylidenenorborene and their mixtures. The molecular weight of polyolefin is above 10,000 g/mole, a preferred range between 20,000 to 1,000,000 g/mole, and a most preferred range between 40,000 to 200,000 g/mole. The polyolefin stereo-structure can be any one of the five types of tacticity known in polyolefins, including atactic, syndiotactic, isotactic, hemiisotactic and isotactic stereoblock, which are very much controlled by the catalyst used.

The term "clay material" is well known in the nanocomposite art and includes phyllosilicate clays, layered silicates, and layered fiber silicates. Illustrative of such materials are the clay minerals such as montmorillonite, nontronite, beidellite, hectorite, saponite, sauconite, vermiculite, ledikite, magadiite, kenyaite, fluoromica, fluorohectorite, attapulgite, boehmite, imogolite, sepiolite, kaolinite, kadinite and their synthetic equivalents. Preferred multi-layered silicate materials are phyllosilicates of the 2:1 type having a negative charge centers on the layers ranging from 0.25 to 1.5 charge centers per formula unit and a commensurate number of exchangeable cations in the interlayer spaces. Most preferred are smectite clay minerals, such as montmorillonite (mmt) that is a naturally occurring 2:1 phyllosilicate, which has the same layered and crystalline structure as talc and mica but a different layer charge. The mmt crystal lattice consists of 1 nm thin layers, with a central octahedral sheet of alumina fused between two external silica tetrahedral sheets (in such a way that the oxygen atoms from the octahedral sheet also belong to the silica tetrahedra). These layers organize themselves in a parallel fashion to form stacks with a regular van der Waals gap between them, called interlayer or gallery. In their pristine form their excess negative charge is balanced by cations ($Na^+$, $Li^+$, $Ca^{2+}$) which exist hydrated in the interlayer. The cations can be easily exchanged to proton ($H^+$) by acid-treatment to form acidic clay. Obviously, in the pristine and acidic states montmorillonite is only miscible with hydrophilic polymers, such as poly(ethylene oxide) and poly(vinyl alcohol). To render montmorillonite miscible with hydrophobic (non-polar) polymers, the general approach is to exchange the alkali counterions with cationic-organic surfactants, such as alkylammoniums, to form organophilic clay. One common commercially available clay is dioctadecylammonium-modified montmorillonite (2C18-mmt).

X-ray diffraction (XRD) measurements can be used to characterize these nanostructures if diffraction peaks are observed in the low-angle region: such peaks indicate the (001) d spacing (basal spacing) of ordered-intercalated nanocomposites. As expected, if the nanocomposites are completely disordered (exfoliated), no peaks are observed in the XRD, due to loss of the parallel registry of the layers. On the other hand, the observation of a strong intercalated XRD peak in the nanocomposite does not guarantee the absence of exfoliated layers. Materials of the present invention may include some intercalated regions; however, their properties are dominated by the exfoliated component, and hence such materials are still considered disordered. The combination of XRD and transmission electron microscopy (TEM) is commonly used to characterize the morphology of these polymer/clay nanocomposite materials.

Figure 2:
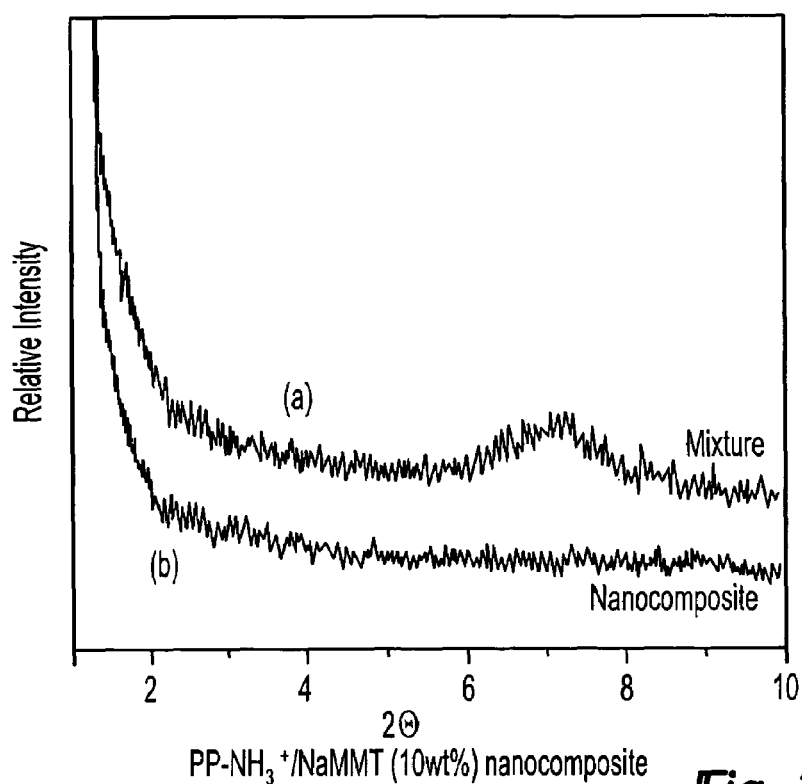
FIG. 2 shows X-ray diffraction patterns of PP-t-NH$_3^+$Cl$^-$/Na$^+$-mmt clay (90/10 weight ratio) upon: (a) simple mixing at ambient temperature and (b) melt blending.
Figure 3:
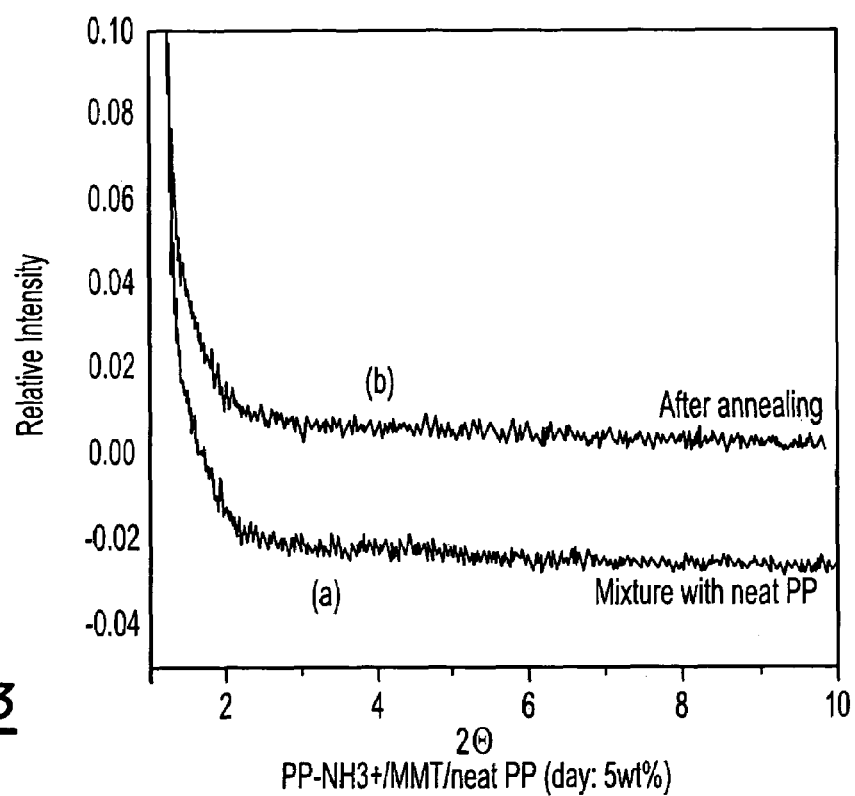
FIG. 3 shows X-ray diffraction patterns of the 50/50 mixture by weight of the exfoliated PP-t-NH$_3^+$Cl$^-$/Na$^+$-mmt (90/10 weight ratio) nanocomposite and neat PP (a) before and (b) after annealing.

One example is shown in FIG. 2, which compares XRD patterns before and after melt blending (90/10 weight ratio) of an ammonium cation terminated i-PP (PP-t-$NH_3^+Cl^-$; $Mn=58,900$ and $Mw=135,500$ g/mol; $T_m=158.2°$ C.) and a pristine montmorillonite clay having $Na^+$ cations ($Na^+$-mmt). The (001) peak at $2\theta=7°$ for Na-mmt interlayer structure completely disappears after melt blending, indicating the formation of an exfoliated PP-t-$NH_3^+Cl^-$/Na-mmt nanocomposite. This exfoliated PP-t-$NH_3^+Cl^-$/Na-mmt nanocomposite was further blended with 50/50 parts by weight of neat commercial i-PP polymer (Mn=110,000 and Mw=250,000 g/mol). FIG. 3 shows the XRD patterns of (a) simple mixing and (b) melt blending. Basically, the exfoliated structure is maintained after further mixing with neat polyolefin (unfunctionalized) that is compatible with the backbone of the chain end functionalized polyolefin.

Figure 4:
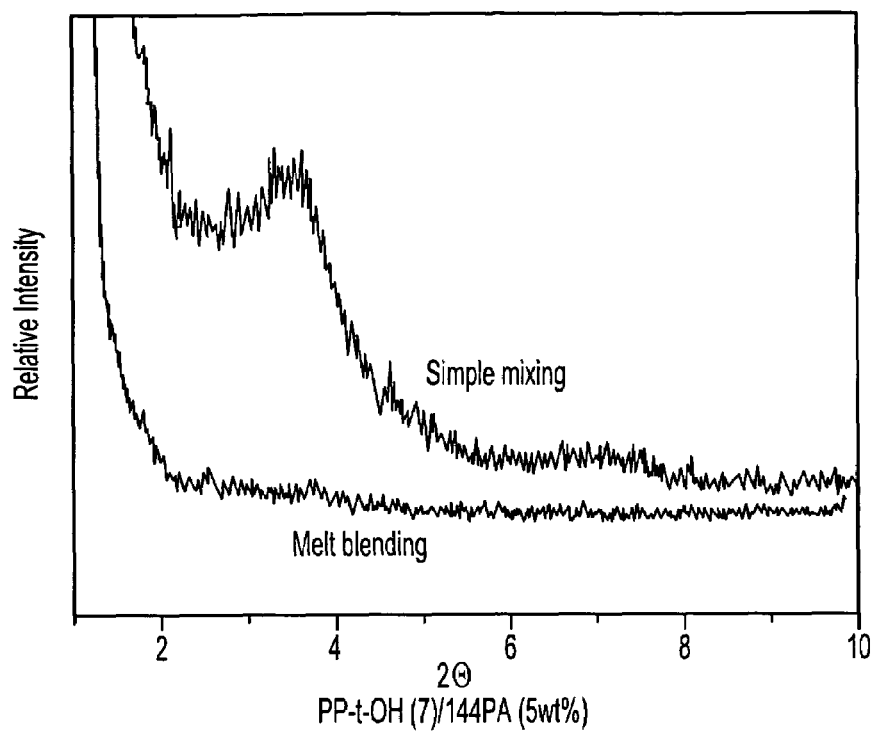
FIG. 4 shows X-ray diffraction patterns of PP-t-OH/2C18-mmt clay (95/5 weight ratio) upon: (a) simple mixing at ambient temperature and (b) melt blending.
Figure 5:
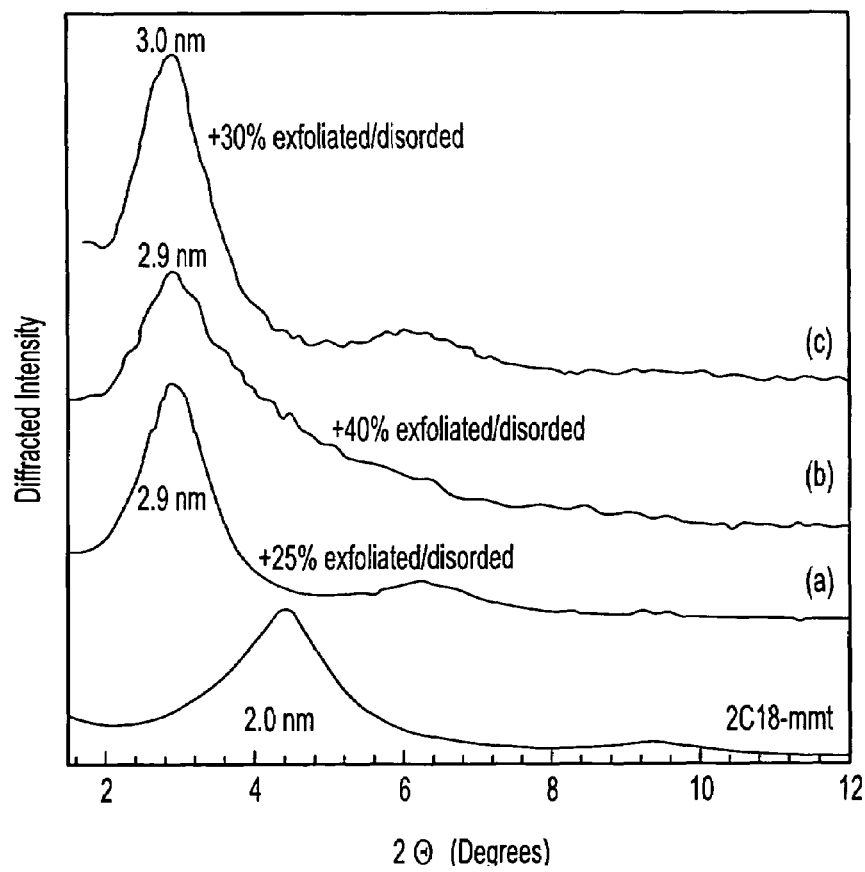
FIG. 5 shows X-ray diffraction patterns of 2C18-mmt clay and three nanocomposites made of 6/94 weight ratio of 2C18-mmt and three side chain functionalized PP ($M_n$=100,000 and $M_w$=200,000 g/mole) containing (a) 1 mole % p-methylstyrene, (b) 0.5 mole % maleic anhydride, and (c) 0.5 mole % hydroxy side groups.

Similar results were also observed in other chain functionalized polyolefin cases. FIG. 4 compares XRD patterns of a simple mixing and a melt blending (95/5 weight ratio) of a hydroxy group terminated polypropylene (PP-t-OH; $T_m=158.2°$ C.; $M_n=52,500$ and $M_w=115,500$ g/mole) and 2C18-mmt clay. The featureless XRD pattern of the melt blending sample clearly shows the exfoliated PP-t-OH/2C18-mmt nanocomposite structure, implying that PP-t-OH is also a good interfacial agent for exfoliating the clay interlayers. For comparison, the similar blending process was also applied to other functional polymer systems, including the side chain functionalized polyolefin containing multiple functional groups randomly distributed along the polymer chain. FIG. 5 shows several XRD patterns, including three nanocomposites made with 6 weight % of 2C18-mmt clay and 94 weight % of three side chain functionalized PPs containing (a) 1 mole % p-methylstyrene, (b) 0.5 mole % maleic anhydride, and (c) 0.5 mole % hydroxy side groups, respectively, and the original 2C18-mmt clay. All of the functionalized PPs were derived from the same random PP copolymer synthesized by metallocene catalysis (Chung et al. U.S. Pat. No. 5,866,659), which contained 1 mol % p-methylstyrene (p-MS) comonomers. Subsequently, the p-MSs were interconverted to functional groups containing hydroxy (OH) and maleic anhydride by lithiation and free-radical reactions, respectively.

The following examples are illustrative of the principles and practice of this invention, although not limited thereto.

EXAMPLES 1-7

Synthesis of Hydroxy-Terminated PE (PE-t-OH) by the Combination of $[Cp_2*ZrMe]^+[MeB(C_6F_5)_3]^-$ Catalyst and 9-BBN Chain Transfer Agent To a parr 450 ml stainless autoclave equipped with a mechanical stirrer, 100 ml of anhydrous/anaerobic toluene and a certain amount of 9-BBN (shown in Table 1) were charged under argon flow. The reactor was purged with ethylene gas (~1 atm) to saturate the solution. About 0.3 mmol of $[Cp_2*ZrMe]^+[MeB(C_6F_5)_3]^-$ catalyst (Cp*=pentamethylcyclopentadienyl) in toluene solution was then syringed into the rapidly stirring ethylene/9-BBN solution under ethylene pressure to initiate the polymerization at ambient temperature. Additional ethylene was fed continuously into the reactor to maintain a constant pressure of 1 atm during the whole course of the polymerization. To minimize mass-transfer and to maintain the constant comonomer feed ratio, the reactions were carried out by rapid mixing and short reaction time. After a three minute reaction time, the polymer solution was quenched with anhydrous MeOH, and the resulting borane-terminated polyethylene (PE-t-B) was washed with THF to remove excess 9-BBN and then dried at 50° C. in a high-vacuum line.

TABLE 1

Metallocene-Activated Ethylene Polymerization in the Presence of 9-BBN as Chain Transfer Agent

| Ex. | 9-BBN (mM) | Reaction time (min) | Yield (g) | Cat. activity (kg of PE/mol of cat. atm · h) | $M_n$ ($\times 10^{-3}$) | $M_w/M_n$ |
|---|---|---|---|---|---|---|
| 1 | 3.0  | 3 | 2.01 | 1333 | 76.0 | 2.4 |
| 2 | 4.5  | 3 | 2.05 | 1366 | 55.5 | 2.9 |
| 3 | 7.5  | 3 | 1.45 | 1033 | 42.2 | 2.6 |
| 4 | 7.5  | 5 | 2.02 | 1333 | 45.8 | 2.6 |
| 5 | 12.0 | 3 | 1.20 | 800  | 19.4 | 2.7 |
| 6 | 18.0 | 3 | 0.75 | 500  | 8.9  | 3.2 |
| 7 | 23.4 | 3 | 0.25 | 167  | 3.7  | 4.0 |

Catalyst: $[Cp*_2ZrMe]^+[MeB(C_6F_5)_3]^-$ with concentration = 0.3 mM; ethylene pressure = 1 atm; [ethylene] = 0.11 M.

Comparing runs 1-7, the polymer molecular weight is almost linearly proportional to the molar ratio of [ethylene]/[9-BBN]. It is clear that the chain transfer reaction to 9-BBN (with rate constant $k_{tr}$) is the dominate termination process, which competes with the propagating reaction (with rate constant $k_p$). The degree of polymerization ($X_n$) follows a simple comparative equation $X_n = k_p[\text{olefin}]/k_{tr}[\text{9-BBN}]$ with a chain transfer constant $k_{tr}/k_p \sim 1/75$.

For converting the terminal borane group to hydroxyl group, the resulting PE-t-B polymer (powder form) was suspended in THF solvent before adding $NaOH/H_2O_2$ (3/1 mole ratio) oxidation reagents. The oxidation reaction was performed at 40° C. for 3 hours to form the corresponding hydroxy-terminated polymer (PE-t-OH). The dispersion was poured into 100 ml of MeOH and filtered. The filtrate of PE-t-OH was further washed with acetone, and then dried in a vacuum oven at 40° C. The PE-t-OH polymers were analyzed by $^1H$ and $^{13}C$ NMR and GPC techniques. The $^1H$ NMR spectrum shows a major chemical shift at 1.30 ppm, corresponding to $CH_2$ in the PE backbone, and several weak peaks at 0.97 ppm (chain end $CH_3$), 1.58 ppm (—$CH_2CH_2$—OH), 2.25 ppm (—OH), 3.62 ppm (—$CH_2$—OH). The peak intensity ratio of OH:$CH_2O$:$CH_3$=1:2:3 (±2%) indicates the exclusive production of hydroxy-terminated polyethylene. It is interesting to note that there is no detectable vinyl group associated with the conventional chain transfer process (via β-H elimination). The same results were also observed in the $^{13}C$ NMR spectra with the chemical shifts corresponding to —$CH_2$—OH (δ 62.99) and chain end $CH_3$ (δ 13.85) groups. These findings strongly indicate the in situ chain transfer to 9-BBN moiety during the catalytic polymerization of ethylene.

EXAMPLES 8-14

Synthesis of Hydroxy-Terminated s-PS (s-PS-t-OH) by the Combination of $[Cp*TiMe_2]^+[MeB(C_6F_5)_3]^-$ Catalyst and 9-BBN Chain Transfer Agent A 50 ml glass reactor, equipped with a magnetic stirrer, was charged with 10 ml of anhydrous/anaerobic styrene and a certain amount (shown in Table 2) of 9-BBN under ultra-high purified argon. About 10 μmol of $[Cp*TiMe_2]^+[MeB(C_6F_5)_3]^-$ catalyst in toluene was then syringed into the rapidly stirred styrene/9-BNN mixture at 25° C. After 3 minutes, the reaction was quenched by anhydrous/anaerobic MeOH, and the reaction products were filtered and washed with anhydrous/anaerobic THF to remove excess 9-BBN. The polymer was then dried at 50° C. in high-vacuum line for 2 hours to obtain the borane-terminated syndiotactic polystyrene (s-PS-t-B). Table 2 summarizes the experimental condition and results.

TABLE 2

Metallocene-Activated Styrene Syndiospecific Polymerization in the Presence of 9-BBN as Chain Transfer Agent

| Ex. | 9-BBN (μmol) | Reaction time (min) | Yield (g) | Catalyst activity | Syndiotactic index | $T_m$ (° C.) | $M_n$ (g/mol) | $M_w/M_n$ |
|---|---|---|---|---|---|---|---|---|
| 8  | 25  | 3 | 1.3 | 2600 | 97.0 | 270 | 230000 | 2.0 |
| 9  | 50  | 3 | 1.4 | 2800 | 96.2 | 271 | 120000 | 2.0 |
| 10 | 100 | 3 | 1.3 | 2600 | 95.8 | 270 | 75000  | 2.1 |
| 11 | 150 | 3 | 1.1 | 2200 | 95.2 | 271 | 40000  | 2.0 |
| 12 | 200 | 3 | 0.8 | 1600 | 93.4 | 270 | 35000  | 2.0 |
| 13 | 300 | 3 | 0.5 | 1000 | 94.7 | 272 | 15000  | 2.2 |
| 14 | 400 | 3 | 0.3 | 600  | 95.0 | 270 | 7500   | 2.3 |

Catalyst = $[Cp*TiMe_2]^+[Me(B(C_6F_5)_3]^-$, catalyst concentration = 10 μmol; Styrene = 10 mL. Catalyst activity = kg of s-PS/mol of catalyst · h Following the similar oxidation procedure shown in Examples 1-7, the s-PS-t-B polymer was oxidized by $NaOH/H_2O_2$ to form the corresponding hydroxy-terminated polymer (s-PS-t-OH) that is examined by a combination of $^1H$ and $^{13}C$ NMR, DSC and GPC measurements. All s-PS-t-OH samples show high syndiotacticity, and high melting point. The narrow molecular distribution in each sample indicates a single active site operated during each polymerization reaction. The polymer molecular weight is almost linearly proportional to the molar ratio of [styrene]/[9-BBN]. It is clear that the chain transfer reaction to 9-BBN (with rate constant $k_{tr}$) is the dominate termination process, which competes with the propagating reaction (with rate constant $k_p$). The degree of polymerization ($X_n$) follows a simple comparative equation $X_n = k_p[\text{styrene}]/k_{tr}[\text{9-BBN}]$.

EXAMPLES 15-25

Synthesis of p-Methylstyrene-Terminated PP (PP-t-p-MS) by the Combination of rac-$Me_2Si[2$-Me-4-Ph(Ind)$]_2ZrCl_2$/MAO Catalyst and p-MS/$H_2$ Chain Transfer Agent In a dry box, 50 ml of toluene and 1.5 ml of MAO (30 wt % in toluene) were charged into a parr 450 ml stainless autoclave equipped with a mechanical stirrer. After removal from the box, the reactor was purged with hydrogen at the pressure for each example as indicated in Table 3, before injecting the reactor with 0.2 g (0.0305 M) of p-methylstyrene. The reactor was then charged with 100 psi propylene to saturate the solution at ambient temperature. About 1.25× $10^{-6}$ mole of rac-$Me_2Si[2$-Me-4-Ph(Ind)$]_2ZrCl_2$ in toluene solution was then syringed into the solution with rapid stirring under propylene pressure to initiate the polymerization. Additional propylene was fed continuously into the reactor to maintain a constant pressure during the entire course of the polymerization. To minimize mass-transfer and to maintain the constant feed ratio, the reactions were carried out with rapid mixing and a short reaction time. After 15 minutes reaction time at 30° C., the polymer solution was quenched with methanol. The resulting p-methylstyrene unit-terminated polypropylene (PP-t-p-MS) was washed with THF to remove excess styrene and then vacuum-dried at 50° C. The PP-t-p-MS polymer obtained in each example was analyzed by $^1$H NMR, $^{13}$C NMR and GPC techniques. The results observed with Examples 15-25 are set forth in Table 3, along with the results observed with four control runs that were carried out under similar reaction procedures and conditions, except Control 1 was run with neither hydrogen nor p-methylstyrene present in the reaction mixture, and Controls 2, 3, and 4 were run without hydrogen, but with various concentration of p-methylstyrene in the reaction mixture.

weight distribution of the resulting PP-t-p-MS polymers. A sufficient quantity of hydrogen, increasing with the increased of p-MS concentration, is needed to maintain high catalyst activity and p-MS conversion. The polymer molecular weight is generally linearly proportional to the molar ratio of [propylene]/[p-MS]. It also is clear that under most reaction conditions the chain transfer reaction to p-MS (with rate constant $k_{tr}$) is the dominant termination process, which competes with the propagating reaction of propylene (with rate constant $k_p$). The degree of polymerization ($X_n$) follows a simple comparative equation $X_n = k_p[\text{propylene}]/k_{tr}[\text{styrene}]$ with a chain transfer constant $k_{tr}/k_p \sim 1/6.36$. In $^1$H NMR spectra of PP-t-p-MS (Mn=4600), in addition to the peaks between 0.9 and 1.7 ppm, corresponding to protons in PP chain, there are peaks at 2.7, 7.1, and 2.35 ppm, corresponding to —CH$_2$, —C$_6$H$_5$ and CH$_3$, respectively, at the polymer chain end.

TABLE 3

Comparison of the experimental results in the rac-Me$_2$Si[2-Me-4-Ph(Ind)]$_2$ZrCl$_2$/MAO catalyzed polymerization[a] of propylene with p-MS/hydrogen chain transfer agents

| Example | p-MS (M) | H$_2$ (psi) | Yield (g) | Cat. Activity[b] | p-MS in PP (mole %) | M$_n$ (g/mole) | PDI (M$_w$/M$_n$) |
|---|---|---|---|---|---|---|---|
| Control 1 | 0 | 0 | 26.94 | 86,208 | 0 | 77,600 | 2.9 |
| Control 2 | 0.0305 | 0 | 0.051 | 163 | 0.16 | 59,700 | 3.4 |
| 15 | 0.0305 | 2 | 3.80 | 12,160 | 0.14 | 55,500 | 1.9 |
| 16 | 0.0305 | 6 | 8.04 | 25,728 | 0.15 | 54,800 | 2.0 |
| 17 | 0.0305 | 12 | 12.04 | 38,528 | 0.15 | 55,400 | 1.9 |
| 18 | 0.0305 | 35 | 24.67 | 78,944 | 0.13 | 34,600 | 2.8 |
| Control 3 | 0.076 | 0 | ~0 | — | — | — | — |
| 19 | 0.076 | 6 | 0.91 | 2,912 | 0.40 | 27,600 | 2.1 |
| 20 | 0.076 | 12 | 1.69 | 5,408 | 0.41 | 25,900 | 2.3 |
| 21 | 0.076 | 20 | 8.81 | 28,192 | 0.43 | 20,500 | 2.4 |
| 22 | 0.076 | 35 | 10.52 | 33,664 | 0.41 | 25,800 | 2.3 |
| Control 4 | 0.153 | 0 | ~0 | — | — | — | — |
| 23 | 0.153 | 12 | 0.35 | 1,120 | 0.66 | 10,000 | 2.3 |
| 24 | 0.153 | 20 | 3.81 | 12,192 | 0.61 | 11,700 | 2.0 |
| 25 | 0.153 | 35 | 27 | 14,112 | 0.63 | 9,700 | 1.9 |

[a]reaction conditions: 50 ml toluene, propylene (100 psi), [Zr] = 1.25 × 10$^{-6}$ mol/l, [MAO]/[Zr] = 3000, temperature = 30° C., time = 15 min.
[b]catalyst activity = kg of PP/mol of catalyst · h.

Comparing the results of Control 1 with those of Control 2, a noticeable decrease in catalyst activity is observed. Clearly, the presence of p-methylstyrene in the reaction mixture resulted in the deactivation of rac-Me$_2$Si[2-Me-4-Ph(Ind)]$_2$ZrCl$_2$/MAO catalyst in the polymerization of propylene. The presence of hydrogen (in Examples 15-18) restored the catalyst activity and completed the chain transfer cycle during the polymerization. In Example 18, with the hydrogen pressure of 35 psi, the catalyst activity was almost the same as that of the homopolymerization of propylene (Control 1). In two series of Examples 19-22 and 23-25, a systematic study was conducted to further evaluate the effect of hydrogen and p-methylstyrene concentrations on the catalyst activity and polymer molecular weight. In general, the change of hydrogen concentration does not have any significant effect on the molecular weight and molecular

EXAMPLES 26-29

Synthesis of p-Chloro-Terminated PP (PP-t-Cl) by the Combination of rac-Me$_2$Si[2-Me-4-Ph(Ind)]$_2$ZrCl$_2$/MAO Catalyst and p-Cl-St/H$_2$ Chain Transfer Agent In a series of examples, several p-chloro-terminated PP (PP-t-Cl) polymers were prepared by using rac-Me$_2$Si[2-Me-4-Ph(Ind)]$_2$ZrCl$_2$/MAO catalyst in the presence of p-chlorostyrene (p-Cl-St) and hydrogen chain transfer agents. A systematic study was conducted to evaluate the effects of hydrogen and p-Cl-St concentrations on the catalyst activity and polymer molecular weight. For each of Examples 26-29, the procedure of Examples 15-25 was followed, except that the p-chlorostyrene was charged. Table 4 summarizes the experimental results.

TABLE 4

A summary of PP-t-Cl polymers prepared[a] by the combination of rac-Me$_2$Si[2-Me-4-Ph(Ind)]$_2$ZrCl$_2$/MAO catalyst and p-Cl-St/hydrogen chain transfer agents

| Ex. | p-Cl-St (M) | H$_2$ (psi) | Yield (g) | Cat. Activity[b] | p-Cl-St in PP (mole %) | M$_n$ (×10$^{-3}$) | PDI (M$_w$/M$_n$) |
|---|---|---|---|---|---|---|---|
| 26 | 0.144 | 6 | 1.36 | 4,402 | 0.13 | 45,300 | 1.9 |
| 27 | 0.144 | 20 | 7.56 | 24,192 | 0.12 | 46,100 | 2.1 |
| 28 | 0.289 | 20 | 4.44 | 15,712 | 0.24 | 18,700 | 2.1 |
| 29 | 0.433 | 27 | 8.48 | 27,200 | 0.39 | 8,200 | 1.9 |

[a]reaction conditions: 50 ml toluene, propylene (100 psi), [Zr] = 1.25 × 10$^{-6}$ mol/l, [MAO]/[Zr] = 3000, temperature = 30° C., time = 15 min.
[b]catalyst activity = kg of PP/mol of catalyst · h.

All reactions show that the presence of hydrogen is necessary to complete the chain transfer reaction to p-chlorostyrene during the rac-Me$_2$Si[2-Me-4-Ph(Ind)]$_2$ZrCl$_2$/MAO mediated polymerization of propylene. In general, the change of hydrogen concentration does not have any significant effect the molecular weight and molecular weight distribution of the resulting polymer. However, a sufficient quantity of hydrogen, increasing with an increase in the concentration of p-Cl-St, is needed to achieve high catalyst activity. Overall, the chain transfer reaction to p-Cl-St (with rate constant $k_{tr}$) competes with the propagating reaction of propylene (with rate constant $k_p$). The degree of polymerization ($X_n$) follows a simple comparative equation $X_n = k_p$[propylene]/$k_{tr}$[p-Cl-St] with a chain transfer constant $k_{tr}/k_p \sim 1/21.2$.

EXAMPLES 30-34

Synthesis of p-Amino-Terminated PP (PP-t-NH$_2$) by the Combination of rac-Me$_2$Si[2-Me-4-Ph(Ind)]$_2$ZrCl$_2$/MAO Catalyst and p-N Si$_2$-St/H$_2$ Chain Transfer Agent (a) Synthesis of 4-{2-[N,N-Bis(trimethylsilyl)amino]ethyl}styrene (p-NSi$_2$-St)

A silane protected chain transfer agent p-NSi$_2$-St was prepared in two steps. In a 500 ml flask equipped with a magnetic stirring bar, 100 g of lithium bis(trimethylsilyl) amide dissolved in 200 ml of THF was slowly added into a mixture of 50 ml (0.658 mol) of chloromethyl methyl ether and 50 ml of THF at 0° C. under a nitrogen atmosphere. After completing the addition, the solution was allowed to warm up to room temperature for 2 hours before evaporating the excess chloromethyl methyl ether and THF solvent. N,N-Bis(trimethylsilys)methoxymethylamine (80% yield) was isolated by distillation. In the second step, p-NSi$_2$-St was prepared by treating 4-vinylbenzylmagnesium chloride with N,N-bis(trimethylsilys)methoxymethylamine. In a 500 ml flask equipped with a magnetic stirring bar and a condenser, 15.2 g of magnesium was suspended in 50 ml dry ether, and 80 ml of 4-vinylbenzyl chloride diluted with 50 ml dry ether was then introduced dropwise through the condenser. The solution was refluxed for 4 hours before the addition of 117 g of N,N-bis(trimethylsilys)methoxymethylamine over a period of 2 hours. The reaction was allowed to proceed at room temperature for another 2 hours before adding 100 ml of aqueous NaOH solution (30%). The organic layer was separated and dried, and the residual was then distilled over CaH$_2$ to obtain p-NSi$_2$-St with 70% yield.

(b) Polymerization and Chain Transfer Reaction

Following the same procedures described in Examples 15-25, the p-NSi$_2$-St terminated PP polymers (PP-t-St-NSi$_2$) were prepared by the combination of rac-Me$_2$Si[2-Me-4-Ph(Ind)]$_2$ZrCl$_2$/MAO catalyst and p-NSi$_2$-St and H$_2$ as the chain transfer agents. A systematic study was conducted to evaluate the effects of p-NSi$_2$-St and H$_2$ concentrations on the catalyst activity and polymer molecular weight. The PP-t-NH$_2$ polymers were then prepared from PP-t-St-NSi$_2$ polymers by treating them with hydrogen chloride, which can be accomplished during the sample work-up step. Alternatively, the isolated PP-t-St-NSi$_2$ (2 g) was suspended in 50 ml of THF at 50° C. before adding dropwise 2 N methanolic hydrogen chloride solution. The mixture was stirred for 4 hours at 50° C., and then poured into 1 N methanolic NaOH solution. The PP-t-NH$_2$ polymer was collected by filtration and washed with 1 M aqueous ammonia and water under a nitrogen atmosphere. The polymer was dried overnight at 50° C. under vacuum. The PP-t-NH$_2$ polymer yield was quantitative. Table 5 summarizes the experimental results.

TABLE 5

A summary of PP-t-NH$_2$ polymers[a] prepared by the combination of rac-Me$_2$Si[2-Me-4-Ph(Ind)]$_2$ZrCl$_2$/MAO catalyst and p-NSi$_2$-St/H$_2$ chain transfer agents

| Ex. | St-NSi$_2$ (mol/l) | H$_2$ (psi) | Cat. activity[b] | NH$_2$ in PP (mol %) | M$_n$ (×10$^{-3}$) | PDI (M$_w$/M$_n$) | Tm (° C.) |
|---|---|---|---|---|---|---|---|
| Control 5 | 0.125 | 0 | ~0 | — | — | — | — |
| 30 | 0.125 | 6 | 1,327 | 0.07 | 56.3 | 2.1 | 159.1 |
| 31 | 0.125 | 12 | 8,480 | 0.06 | 55.4 | 2.5 | 158.4 |
| 32 | 0.125 | 20 | 31,655 | 0.08 | 58.9 | 2.3 | 158.2 |

TABLE 5-continued

A summary of PP-t-NH$_2$ polymers[a] prepared by the
combination of rac-Me$_2$Si[2-Me-4-Ph(Ind)]$_2$ZrCl$_2$/
MAO catalyst and p-NSi$_2$-St/H$_2$ chain transfer agents

| Ex. | St-NSi$_2$ (mol/l) | H$_2$ (psi) | Cat. activity[b] | NH$_2$ in PP (mol %) | M$_n$ (×10$^{-3}$) | PDI (M$_w$/M$_n$) | Tm (° C.) |
|---|---|---|---|---|---|---|---|
| Control 6 | 0.250 | 0 | ~0 | — | — | — | — |
| 33 | 0.250 | 12 | 2,622 | 0.18 | 25.3 | 2.2 | 156.3 |
| 34 | 0.250 | 20 | 10,066 | 0.19 | 24.2 | 2.3 | 155.9 |

[a]Reaction conditions: 50 ml toluene, [Zr] = 1.25 × 10$^{-6}$ moles, [MAO]/[Zr] = 3000, temperature = 30° C., time = 15 min.
[b]Catalyst activity = kg of PP/mol of catalyst · h.

Overall, the PP-t-NH$_2$ molecular weight is governed by the chain transfer agent—the higher the concentration of the p-NSi$_2$-St, the lower the molecular weight of the resulting polymer. It is clear that the chain transfer reaction to p-NSi$_2$-St (with rate constant k$_{tr}$) is the dominant termination process, and that it competes with the propagating reaction (with rate constant k$_p$). The degree of polymerization (X$_n$) follows a simple comparative equation X$_n$=k$_p$[olefin]/k$_{tr}$[St-NSi$_2$] with a chain transfer constant of k$_{tr}$k$_p$=1/34. $^1$H NMR spectra of PP-t-St-NSi$_2$ polymer and the corresponding PP-t-St-NH$_2$ show clean deprotection reaction with the complete disappearance of the silane protecting group at 0.24 ppm.

EXAMPLES 35-40

Synthesis of p-Hydroxystyrene-Terminated PP (PP-t-OH) by the Combination of rac-Me$_2$Si[2-Me-4-Ph(Ind)]$_2$ZrCl$_2$/MAO Catalyst and p-OSi-St/H$_2$ Chain Transfer Agent (a) Synthesis of 4-(t-butyldimethylsilyloxy)styrene (p-OSi-St)

p-OSi-St chain transfer agent was synthesized in two steps. In a 500 ml flask equipped with a magnetic stirring bar, 70.4 g of imidazole was mixed with 52.4 g (0.42 mol) of 4-hydroxybenzaldehyde and 77.4 g of t-butyldimethylsilyl chloride in THF solution. The mixture was stirred at ambient temperature for 4 hours before being poured into cold water. The organic layer was separated and extracted with ether, then dried with magnesium sulfate. After evaporating the solvent, 94 g of 4-(t-butyldimethylsilyloxy)benzaldehyde (90% yield), a deep yellow color liquid, was obtained. The second reaction step was performed under a nitrogen atmosphere. In a 500 ml flask equipped with a magnetic stirring bar, 123.6 g of methyltriphenylphosphonium bromide suspended in THF was treated with 149.6 ml of n-butyllithium (2.5M in hexane). After 1 hour, 80.0 g of 4-(t-butyldimethylsilyloxy)benzaldehyde was introduced dropwise into the red solution. The mixture was stirred overnight at room temperature and then poured into cold water. The organic layer was separated by ether extraction and dried with magnesium sulfate. Further purification was performed by distillation under vacuum (10 Torr) at elevated temperature (80° C.). 65 g of p-OSi-St was obtained with a yield of more than 90%. Its structure was confirmed by $^1$H NMR spectrum.

(b) Polymerization and Chain Transfer Reaction

Following the same procedures in Examples 15-25, the p-OSi-St terminated PP polymers (PP-t-St-OSi) were prepared by a combination of rac-Me$_2$Si[2-Me-4-Ph(Ind)]$_2$ZrCl$_2$/MAO catalyst and p-OSi-St and H$_2$ as the chain transfer agents. A systematic study was conducted to evaluate the effects of p-OSi-St and H$_2$ concentrations on the catalyst activity and polymer molecular weight. The objective PP-t-OH polymers were prepared from PP-t-St-OSi polymers by treating them with hydrogen chloride, which can be accomplished during the sample work-up step by mixing polymer with 2 N methanolic hydrogen chloride solution. The PP-t-OH polymer was collected by filtration and washed with 1 M aqueous ammonia and water under a nitrogen atmosphere. The polymer was dried overnight at 50° C. under vacuum. Table 6 summarizes the experimental results.

TABLE 6

A summary of PP-t-OH polymers[a] prepared by the combination of rac-Me$_2$Si [2-Me-4-Ph(Ind)]$_2$ZrCl$_2$/MAO catalyst and p-OSi-St/H$_2$ chain transfer agents

| Ex. | p-OSi-St (mol/l) | H$_2$ (psi) | Cat. activity[b] | St-OH in PP (mol %) | M$_n$ (×10$^{-3}$) | PDI (M$_w$/M$_n$) | Tm (° C.) |
|---|---|---|---|---|---|---|---|
| Control 7 | 0.198 | 0 | ~0 | — | — | — | — |
| 35 | 0.198 | 6 | 1,165 | 0.09 | 52.1 | 2.3 | 159.1 |
| 36 | 0.198 | 12 | 7,637 | 0.08 | 53.4 | 2.4 | 158.4 |
| 37 | 0.198 | 20 | 26,995 | 0.10 | 52.5 | 2.2 | 158.2 |
| Control 8 | 0.396 | 0 | ~0 | — | — | — | — |
| 38 | 0.396 | 6 | ~0 | — | — | — | — |

TABLE 6-continued

A summary of PP-t-OH polymers[a] prepared by the combination of rac-Me$_2$Si [2-Me-4-Ph(Ind)]$_2$ZrCl$_2$/MAO catalyst and p-OSi-St/H$_2$ chain transfer agents

| Ex. | p-OSi-St (mol/l) | H$_2$ (psi) | Cat. activity[b] | St-OH in PP (mol %) | M$_n$ (×10$^{-3}$) | PDI (M$_w$/M$_n$) | Tm (° C.) |
|---|---|---|---|---|---|---|---|
| 39 | 0.396 | 12 | 2,039 | 0.18 | 23.4 | 2.5 | 157.4 |
| 40 | 0.396 | 20 | 8,318 | 0.20 | 22.0 | 2.0 | 156.3 |

[a]Reaction conditions: 50 ml toluene, [Zr] = 1.25 × 10$^{-6}$ moles, [MAO]/[Zr] = 3000, temperature = 30° C., time = 15 min.
[b]Catalyst activity = kg of PP/mol of catalyst · h.

Overall, the PP-t-OH molecular weight is governed by the chain transfer agent. The degree of polymerization ($X_n$) follows a simple equation $X_n$=k$_p$[olefin]/k$_{tr}$[St-OSi] with a chain transfer constant of k$_{tr}$/k$_p$=1/48 for p-OSi-St. The interconversion of between PP-t-St-OSi and the corresponding PP-t-OH was monitored by $^1$H NMR spectra. In addition to three major peaks (δ=0.95, 1.35, and 1.65 ppm) for the CH$_3$, CH$_2$, and CH groups in the PP backbone, there are three minor chemical shifts at 0.25, 2.61, and 6.75-7.18 ppm (with an intensity ratio near 6/2/4), corresponding to —OSi (CH$_3$)$_2$(t-Bu), —CH$_2$—ϕ, and —CH$_2$—C$_6$H$_4$—OSi, respectively. After deprotection reaction, which can be accomplished during the sample work-up step by using HCl solution, the chemical shift for the silane protecting group completely disappears. The equally split chemical shifts for the phenyl protons, combined with no detectable side product, further indicate the terminal p-alkylphenol moiety.

EXAMPLE 41

Preparation of PP-t-NH$_3$$^+$Cl$^-$/Na$^+$-Montmorillonite Clay Nanocomposite

Na$^+$-montmorillonite clay (Na$^+$-mmt) with an ion-exchange capacity of ca. 90 mequiv/100 g (WM) was obtained from Southern Clay Product. PP-t-NH$_3$$^+$Cl$^-$ (T$_m$=158.2° C.; M$_n$=58,900 and M$_w$=135,500 g/mole) was prepared in Example 32 using excess HCl reagent. Static melt intercalation was employed to prepare PP-t-NH$_3$$^+$Cl$^-$/Na$^+$-montmorillonite nanocomposite. PP-t-NH$_3$$^+$Cl$^-$ dried powder and Na$^+$-mmt with 90/10 weight ratio were firstly mixed and grounded together in a mortar and pestle at ambient temperature. The XRD pattern of this simple mixture shows a (001) peak at 2θ~7, corresponding to Na$^+$-mmt interlayer structure with a d-spacing of 1.45 nm. The mixed powder was then heated at 190° C. for 2 hr under nitrogen condition. The resulting PP-t-NH$_3$$^+$Cl$^-$/Na$^+$-mmt nanocomposite shows a featureless XRD pattern, indicating the formation of an exfoliated clay structure.

EXAMPLE 42

Preparation of PP/PP-t-NH$_3$$^+$Cl$^-$/Na$^+$-Montmorillonite Clay Nanocomposite The binary PP-t-NH$_3$$^+$Cl$^-$/Na-mmt exfoliated nanocomposite obtained from Example 41 was further melt mixing (50/50 weight ratio) with commercial neat i-PP (Mn=110,000 and Mw=250,000 g/mol). Firstly, the PP-t-NH$_3$$^+$Cl$^-$/Na-mmt exfoliated nanocomposite and neat i-PP with 50/50 weight ratio were grounded together in a mortar and pestle at ambient temperature. This simple mixture shows a featureless XRD pattern. The mixed powder was then heated at 190° C. for 2 hours under nitrogen condition. The resulting ternary PP/PP-t-NH$_3$$^+$Cl$^-$/Na$^+$-mmt nanocomposite also shows a featureless XRD pattern, indicating that the stable exfoliated structure in the binary PP-t-NH$_3$$^+$Cl$^-$/Na-mmt exfoliated nanocomposite is clearly maintained after further mixing with PP that is compatible with the backbone of PP-t-NH$_3$$^+$Cl$^-$.

EXAMPLE 43

Preparation of PP-t-OH/2C18-Montmorillonite Clay Nanocomposite

Dioctadecylammonium-modified montmorillonite clay (2C18-mmt) was obtained from Southern Clay Product. PP-t-OH (T$_m$=158.2° C.; M$_n$=52,500 and M$_w$=115,500 g/mole) was prepared in Example 37. Static melt intercalation was employed to prepare PP-t-OH/2C18-mmt nanocomposite: PP-t-OH dried powder and 2C18-mmt with 95/5 weight ratio were firstly mixed and grounded together in a mortar and pestle at ambient temperature. The XRD pattern of this simple mixture shows a (001) peak at 2θ ~3.85, corresponding to 2C18-mmt interlayer structure with a d-spacing of 1.98 nm. The mixed powder was then heated at 190° C. for 2 hours under nitrogen condition. The resulting PP-t-OH/2C18-mmt nanocomposite shows a featureless XRD pattern, indicating the formation of an exfoliated clay structure.

While the invention has been particularly shown and described with reference to preferred embodiments thereof, it will be understood by those skilled in the art that various alterations in form and detail may be made therein without departing from the spirit and scope of the invention. All of such modifications and variations are within the scope of this invention. It is the following claims which define the scope of the invention.

The invention claimed is:

1. An exfoliated, polyolefin/clay nanocomposite material comprising:
 the reaction product of reactants consisting essentially of:
 a clay having a layered structure, and a functionalized polyolefin material having the general formula:

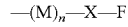

wherein M is an olefinic monomer, n is an integer in the range of 100 to 100,000, F is a hydrophilic group capable of binding to said clay, and X is optional and is a linker group;
 said polyolefin/clay nanocomposite having an exfoliated structure.

2. The polyolefin/clay nanocomposite of claim 1, wherein F is selected from the group consisting of: OH, COOR, NR$_2$, NR$^+_3$, an anhydride, an imidazolinium, sulfonium, and phosphonium, wherein said R groups are, independently, H or alkyl.

3. The polyolefin/clay nanocomposite of claim 1, wherein X is a residue of a chain transfer agent or a termination agent.

4. The polyolefin/clay nanocomposite of claim 3, wherein X is an alkoxyl group, an alkyl group or an alkyl-aryl group.

5. The polyolefin/clay nanocomposite of claim 1, wherein said clay is a silicate clay.

6. The polyolefin/clay nanocomposite of claim 5, wherein the layered silicate clay is selected from phyllosilicate clays, layered silicates, layered fiber silicates, montmorillonite, nontronite, beidellite, hectorite, saponite, sauconite, vermiculite, ledikite, magadiite, kenyaite, fluoromica, fluorohectorite, attapulgite, boehmite, imogolite, sepiolite, kaolinite, kadinite, synthetic equivalents, and combinations thereof.

7. The polyolefin/clay nanocomposite of claim 5, wherein the layered silicate clay is an organophilic clay that has been treated with a cationic-organic surfactant.

8. The polyolefin/clay nanocomposite of claim 7, wherein said cationic-organic surfactant is an alkyl ammonium compound.

9. The polyolefin/clay nanocomposite of claim 5, wherein the layered silicate clay is an acidic clay that has been treated with an acid.

10. The polyolefin/clay nanocomposite of claim 1, wherein M is selected from the group consisting of: ethylene, propylene, 1-butene, isobutylene, 1-pentene, 1-hexene, 1-octene, 3-methyl-1-butene, 4-methyl-1-pentene, cyclopentene, norbornene, phenylnorbornene, indanylnorbornene, styrene, p-methylstyrene, butadiene, isoprene, 1-4 hexadiene, 1-5 hexadiene, divinylbenzene, vinylidenenorbornene, and combinations thereof.

11. The polyolefin/clay nanocomposite of claim 1, wherein the functionalized polyolefin material is a functionalized polypropylene having a terminal functional group selected from the group consisting of OH, NH$_2$, anhydride, ammonium, immidazolium, sulfonium, phosphonium cations, and molecular weight at least 10,000.

12. The polyolefin/clay nanocomposite of claim 1, wherein the functionalized polyolefin material is a functionalized polyethylene having a terminal functional group selected from the group consisting of OH, NH$_2$, anhydride, ammonium, immidazolium, sulfonium, phosphonium cations, and molecular weight at least 10,000.

13. The polyolefin/clay nanocomposite of claim 1, wherein the functionalized polyolefin material is a functionalized syndiotactic polystyrene containing a terminal functional group selected from the group consisting of OH, NH$_2$, anhydride, ammonium, immidazolium, sulfonium, phosphonium cations, and molecular weight at least 10,000.

14. The polyolefin/clay nanocomposite of claim 1, wherein the functionalized polyolefin material is a functionalized poly(ethylene-co-styrene) random copolymer having styrene content between 10 and 40 mole %, and a terminal functional group selected from the group consisting of OH, NH$_2$, anhydride, ammonium, immidazolium, sulfonium, phosphonium cations, and molecular weight at least 10,000.

15. The polyolefin/clay nanocomposite of claim 1, wherein the functionalized polyolefin material is a functionalized poly(isobutylene-co-isoprene) elastomer having isoprene content of up to 10 mole %, and a terminal functional group selected from the group consisting of OH, NH$_2$, anhydride, ammonium, immidazolium, sulfonium, phosphonium cations, and molecular weight at least 10,000.

16. The polyolefin/clay nanocomposite of claim 1, wherein the functionalized polyolefin material is a functionalized ethylene/propylene/diene elastomer having diene content up to 10 mole %; and a terminal functional group selected from the group consisting of OH, NH$_2$, anhydride, ammonium, immidazolium, sulfonium, phosphonium cations, and molecular weight at least 10,000 wherein the diene comprises 1,4-hexadiene, divinylbenzene, or vinylidenenorborene.

17. The polyolefin/clay nanocomposite of claim 1, further including an ancillary ingredient selected from the group consisting of pigments, fillers, reinforcing fibers, carbon particles, stabilizers, dyes, plasticizers, fire retardants, and combinations thereof.

* * * * *